US006609208B1

(12) United States Patent
Farkas et al.

(10) Patent No.: US 6,609,208 B1
(45) Date of Patent: Aug. 19, 2003

(54) ENERGY-BASED SAMPLING FOR PERFORMANCE MONITORING

(75) Inventors: Keith I. Farkas, San Carlos, CA (US); Carl A. Waldspurger, Atherton, CA (US)

(73) Assignee: Hewlett-Packard Development Company, Houston, TX (US)

(*) Notice: Subject to any disclaimer, the term of this patent is extended or adjusted under 35 U.S.C. 154(b) by 585 days.

(21) Appl. No.: 09/611,808

(22) Filed: Jul. 7, 2000

(51) Int. Cl.[7] ............................................... G06F 1/32
(52) U.S. Cl. ..................................................... 713/320
(58) Field of Search ................................. 713/300, 320, 713/340

(56) References Cited

U.S. PATENT DOCUMENTS

| | | | |
|---|---|---|---|
| 5,563,799 A | * 10/1996 | Brehmer et al. ............ | 702/186 |
| 5,796,939 A | 8/1998 | Berc et al. .............. | 395/184.01 |
| 5,809,450 A | 9/1998 | Chrysos et al. ............ | 702/186 |
| 5,857,097 A | 1/1999 | Henzinger et al. .......... | 395/583 |
| 5,923,872 A | 7/1999 | Chrysos et al. ............ | 395/591 |

FOREIGN PATENT DOCUMENTS

EP        0 864 979 A2     9/1998    ............ G06F/11/34

OTHER PUBLICATIONS

Tajana Simunic et al., "Energy–Efficient Design of Battery–Powered Embedded Systems," Copyright ©1999 ACM 1–58113–133–X/99/0008, ISLPED99, San Deigo, CA pp 212–217.

Jason Flinn et al., "PowerScope: A Tool for Profiling the Energy Usage of Mobile Applications," undated, School of Computer Science, Carnegie Mellon University, pp1–9.
Jennifer M. Anderson et al., "Continuous Profiling: Where Have All the Cycles Gone?," Jul. 28, 1997, Modified Sep. 3, 1997, Palo Alto, CA, pp 1–20.
William E. Weihl, "Compaq (Digital) Continuous Profiling Infrastructure (DCPI)," Dec. 7, 1999, Palo Alto, CA, www.unix.digital.com/dcpi/doc.../ CPI%20Continuous%20Profiling%20Infrastructure.ht, pp 1–3.
"DCPI Documentation," Mar. 31, 2000, U.S., www.unix-.digital.com/dcpi/documentation.htm, pp 1–6.
Jeffrey Dean et al., "Profile Me: Hardware Support for Instruction–Level Profiling on Out–of–Order Processors," Copyright ©1997 IEEE, Dec. 1–3, 1997, Triangle Park, North Carolina, pp. 1–12.

* cited by examiner

Primary Examiner—Thomas M. Heckler

(57) ABSTRACT

The present invention performs energy usage profiling of computing resources using an energy-based interrupt source for sampling. The present invention uses energy consumption as an event to be monitored by specialized profiling hardware. An energy consumption counter tracks the energy consumed by the computing resources and generates an interrupt after a specific energy count is attained. Profiling software uses the counter to statistically estimate the amount of energy used by regions of code at various levels of abstraction. Code that uses more energy to execute will accumulate proportionally more samples, producing an energy usage profile that is both detailed and accurate, as desired.

16 Claims, 4 Drawing Sheets

ENERGY-BASED SAMPLING FOR PERFORMANCE MONITORING

BACKGROUND

1. Field of Invention

The present invention relates generally to energy usage profiling, and more particularly, to the energy-based sampling of computing resources in order to profile energy consumption.

2. Background of the Invention

Limited battery life is a well-known problem with portable computers. Since batteries can store only a limited amount of engergy, energy is a critical resource for portable computers. In order to optimize software for reduced energy consumption and extended battery life, it is important to understand how energy consumption is affected by program behavior. System and software designers need to understand how program execution affects energy consumption. Ideally, these designers would like to attribute energy consumption to specific software components such as applications, processes, or even individual functions and operations.

Such detailed information would facilitate manual or automated identification of the code sequences that account for a significant portion of the overall energy consumption. It also would facilitate manual or automatic optimizations to be applied to these sequences with the aim of reducing overall energy consumption and extending battery life. Some optimizations may involve replacing particular code sequences with more energy-efficient alternatives. Other optimizations may also involve algorithmic changes. For example, to detect the occurrence of asynchronous events, it is often more energy efficient to use interrupts than to busy wait. However, because it is easier to write a program to use busy waiting, designers may wish to only use interrupts where doing so would save a noteworthy amount of energy. The method in which applications interact can also incur an energy cost. For example, a poorly designed synchronization mechanism may result in applications that, while accessing a shared resource, spend a lot of time unnecessarily waiting and hence waste energy. Finally, the design of the operating system can also impact the energy consumed by both itself and applications running on top of it. For example, in a multitasking operating system, a poorly chosen timeslice interval may cause unnecessary context switches or cache flushes.

Statistical sampling is a well-known technique for monitoring the performance of software systems. Sampling-based systems, such as Compaq's™ Continuous Profiling Infrastructure (DCPI), statistically estimate the number of events associated with regions of code, such as the number of cycles spent executing a function, or the data cache miss rate of a load instruction. This type of sampling-based system is described further in U.S. Pat. No. 5,796,939, entitled "High Frequency Sampling of Processor Performance Counters," issued Aug. 18, 1998, the subject matter of which is herein incorporated by reference in its entirety. To support such sampling profilers, many processors contain specialized hardware to count events and generate an interrupt after a specified number of events have occurred. For example, the Compaq™ Alpha 21164 microprocessor can count dozens of events, including processor cycles, fetched or executed instructions, data or instruction cache misses, and translation lookaside buffer (TLB) misses.

Assuming that interrupts are delivered promptly, the number of event-based samples associated with a program location (i.e., the interrupted program counter address, or PC) will be proportional to the total number of events that occurred at that location. For example, in DCPI profiles, instructions that take longer to execute will accumulate proportionally more "cycles" events, and instructions that miss more often in the instruction cache will accumulate proportionally more "imiss" events.

Although statistical sampling of program structures is well known, these statistical sampling techniques do not provide a mechanism by which the energy consumed by a program may be mapped to specific software components. For the reasons noted above, it would be desirable to extend the functionality provided by DCPI and other monitoring systems to the domain of energy profiling.

A prior art approach to mapping energy consumption to software components is given by Jason Flinn and M. Satyanarayanan in, "PowerScope: A Tool for Profiling the Energy Usage of Mobile Applications", Proceedings of the $2^{nd}$ IEEE Workshop on Mobile Computing Systems and Applications, New Orleans, La., Feb. 25–26, 1999 ("PowerScope"). PowerScope profiles the power consumed by applications running on a computer system by using an external digital multimeter and a second computer for data collection. To begin profiling, the data collection computer configures the multimeter to generate a trigger at fixed time intervals. Each time the trigger occurs, an interrupt-service request is registered with the computer being profiled. When this computer subsequently services the interrupt, software running on the computer collects a sample containing the current process ID (PID) and program counter address (PC). Before a trigger is generated, however, the multimeter measures and records the amount of electrical current being drawn by the profiled computer, since variations in the supply voltage were found to be small. The instantaneous current reading is then transferred asynchronously to the software running on the data collection computer.

Once profiling has been completed, the current readings and PID/PC samples are processed. PowerScope first estimates the energy consumption during each time interval. The estimate assumes that each instantaneous current reading represents the average amount of current drawn during the corresponding interval. Accordingly, the energy consumed during an interval is estimated as the product of the length of the time interval, the current reading for the interval, and the predetermined and assumed constant value of the supply voltage. Next, PowerScope correlates these estimates with the PID/PC samples.

The PowerScope profiling approach of time-based instantaneous power measurements has several significant disadvantages, including a lack of simplicity, accuracy, and efficiency. The PowerScope system design is cumbersome. For instance, PowerScope requires an external digital multimeter, connected to a second, separate computer system that records energy readings. It would be more practical and less expensive to have a simpler system that could be incorporated into the computer system of interest.

The PowerScope approach also introduces two potential sources of inaccuracy. First, the sampling interval is based on time, and the energy measurements reflect only the instantaneous power usage when samples are taken. PowerScope assumes that the cumulative energy over the interval can be computed as the product of the interval duration and the instantaneous power measurement. However, this assumption is suspect, since application power consumption varies over time, and is not necessarily correlated with time.

The large variation in power consumption over time is illustrated by the power usage graph shown in FIG. 3. This graph plots the power consumed by an Itsy Pocket Computer from Compaq™ as the Linux operating system is booted and several applications are run. The power data in FIG. 3 was obtained by measuring 50 times a second the current supplied to the Itsy and the supply voltage. As shown in FIG. 3, the power consumed fluctuates between approximately 0.2–1.8 watts.

Second, to avoid significant distortion from the power consumption of the interrupt handler that runs on the system being profiled, PowerScope delays the interrupt until after the multimeter has finished making its instantaneous power reading. By so doing, a significant amount of skew is introduced between the meter and the computer being profiled. This skew is sufficient that PowerScope cannot be used to accurately map energy consumption to program structures any smaller than a procedure.

PowerScope records energy measurements and program location samples separately (in fact, on different computers), and the separate sets of data are correlated offline at a later time. This restriction prevents several optimizations, such as the online aggregation of data (e.g., as used in DCPI). In addition, PowerScope is energy-inefficient, since the number of samples taken is proportional to time, and not energy consumption. PowerScope also may significantly perturb the system being monitored. For example, some processors (such as the Intel® StrongARM SA-1100 used on the Itsy Pocket Computer) support a low-power idle mode that is exited when an interrupt occurs. In this case, each interrupt will bring the processor out of idle mode, thereby needlessly consuming energy. Further, if the sampling rate is sufficiently high that the system does not re-enter the low-power mode before a subsequent sample occurs, the samples so obtained will not reflect the actual energy consumption of the system. These two potential effects are exacerbated by the insensitivity of the sampling rate to the level of power consumption. That is, in spite of the system being in a low-power mode, samples will continue to be acquired at a rate more suited for when the system is consuming a greater amount of power.

Accordingly, there is a need for a system and method for energy usage profiling of computing resources that overcomes the lack of simplicity, accuracy, and efficiency found in the prior art.

SUMMARY OF THE INVENTION

The present invention performs energy usage profiling of computing resources using an energy-based interrupt source for sampling. The present invention introduces energy consumption as a new type of event to be monitored by specialized profiling hardware. An energy consumption counter tracks the energy consumed by the computing resources and generates an interrupt after a specific amount of energy has been consumed. Profiling software uses the counter to statistically estimate the amount of energy used by regions of code at various levels of abstraction. Code that uses more energy to execute will accumulate proportionally more samples, producing an energy usage profile that is both detailed and accurate, as desired.

In one embodiment, an energy profiling system comprises an energy counter for measuring energy consumed by a computer system and an energy comparator that generates an interrupt request subject to a determination that the energy counter has reached a predetermined energy threshold. The energy profiling system further includes a sampling driver (software than runs on the computer system of interest) for recording information about a region of computer code in response to receiving the interrupt request. Such information includes the current process ID and the PC address of the instruction currently in execution at the time that the interrupt is serviced. The energy profiling system resets after each interrupt request to resume measuring energy usage.

In another embodiment, an energy-based sampling system comprises a circuit for measuring the energy drawn from a power source and sending a signal when an energy threshold is reached, and a count-down counter coupled to the circuit for receiving the signal and generating an interrupt request when a predetermined number of signals have been received. Thus, this embodiment limits the occurrence of interrupts to a fixed multiple of the energy threshold. The system further includes a processor for receiving the interrupt and suspending the execution of a current application executing on the processor so that the sampling driver may be run.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The foregoing merely summarizes aspects of the invention. The present invention is more completely described with respect to the following drawings and detailed description.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Reference will now be made in detail to several embodiments of the present invention, examples of which are illustrated in the accompanying drawings. Wherever practicable, the same reference numbers will be used throughout the drawings to refer to the same or like parts.

Figure 1:
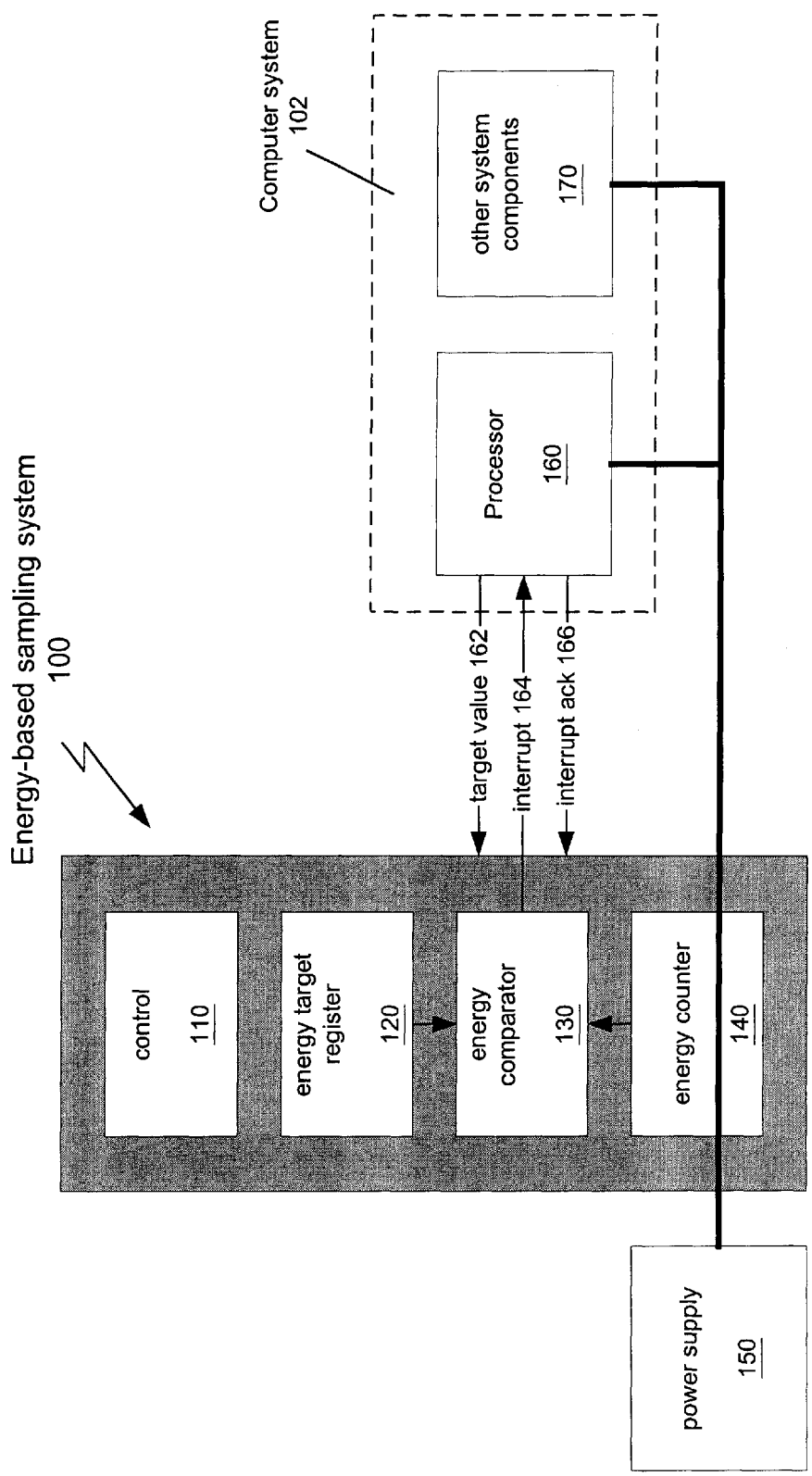
FIG. 1 is an overall diagram of an embodiment of an energy profiling system incorporated with a computer system.

FIG. 1 is a diagram of an energy profiling system comprising an energy-based sampling system 100 incorporated with a computer system 102. The computer system 102 comprises a processor 160 and other computer system components 170. Computer system 102 is connected to the energy-based sampling system 100 and a power supply 150. The energy-based sampling system 100 is combined with the computer system 102 for periodically sampling the regions of code running within the computer system 102 and developing an energy usage profile of the various code regions. The energy-based sampling system 100 comprises control functions 110, an energy target register 120, an energy comparator 130 and an energy counter 140. For ease of discussion, the computer system 102 is initially assumed to have a single power domain. A discussion of extending the system to multiple domains is given later in this document.

The control functions 110 manage the operation of the energy-based sampling system 100. The energy target register 120 receives and stores an energy target value 162 from the processor 160. The energy target value 162 is used to determine the energy granularity at which the computer system 102 code will be sampled, and may be varied to vary the effective sampling rate. The energy target value 162 is chosen to be greater than the minimum energy value that the energy-based sampling system 100 can count accurately, which is an implementation-specific threshold.

The energy counter 140 measures the amount of energy drawn from power supply 150 and consumed by the computer system 102 since the energy counter 140 was last reset. Simultaneously, the energy comparator 130 compares the accumulated energy consumption with the energy target value 162. When the measured energy value equals or exceeds the energy target value 162, the energy comparator 130 generates an interrupt request 164. The energy counter 140 is reset and begins counting energy again after the interrupt request 164 is generated or after it is serviced.

The processor 160 interprets the interrupt request 164 as an indication that an energy-based sampling event has occurred. Accordingly, the processor 160 will suspend the program that it is currently executing, and will begin executing the interrupt handler software that is responsible for gathering samples and controlling the sampling process. In one embodiment, the interrupt handler software is implemented as a pseudo-device driver, referred to herein as a sampling driver. The interrupt acknowledgement (ack) 166 signal is used to signal to the energy-based sampling system 100 that its current request is being serviced. Techniques for generating an acknowledgement signal are well know to those skilled in the art of microprocessor design. In the preferred embodiment, the ack signal 166 is generated explicitly by the sampling driver through its execution of one or more special instructions.

The sampling driver records the desired information about the state of the computer system 102; for example, the sampling driver records the program location executing when the interrupt was generated. In one embodiment, the information is stored in a buffer for subsequent classification and analysis. In another embodiment, for higher performance, it may be desirable to aggregate energy-based samples in an accumulating data structure, such as a hash table.

Before returning control back to the program being profiled, the sampling driver may also store a new value in the energy target register 120. The ability to store a new energy target value 162 is useful for controlling the effective sampling rate, and also for preventing unwanted correlations with program behavior, such as the execution of a loop. For example, if the execution of a particular program loop consumes the same amount of energy as the energy target value 162, the same portion of the program loop will be continuously sampled. By varying the value of the energy target 162 for each sample using a randomized distribution about some desired mean, the profiling software can ensure that all interesting portions of the program will be sampled.

Figure 2A:
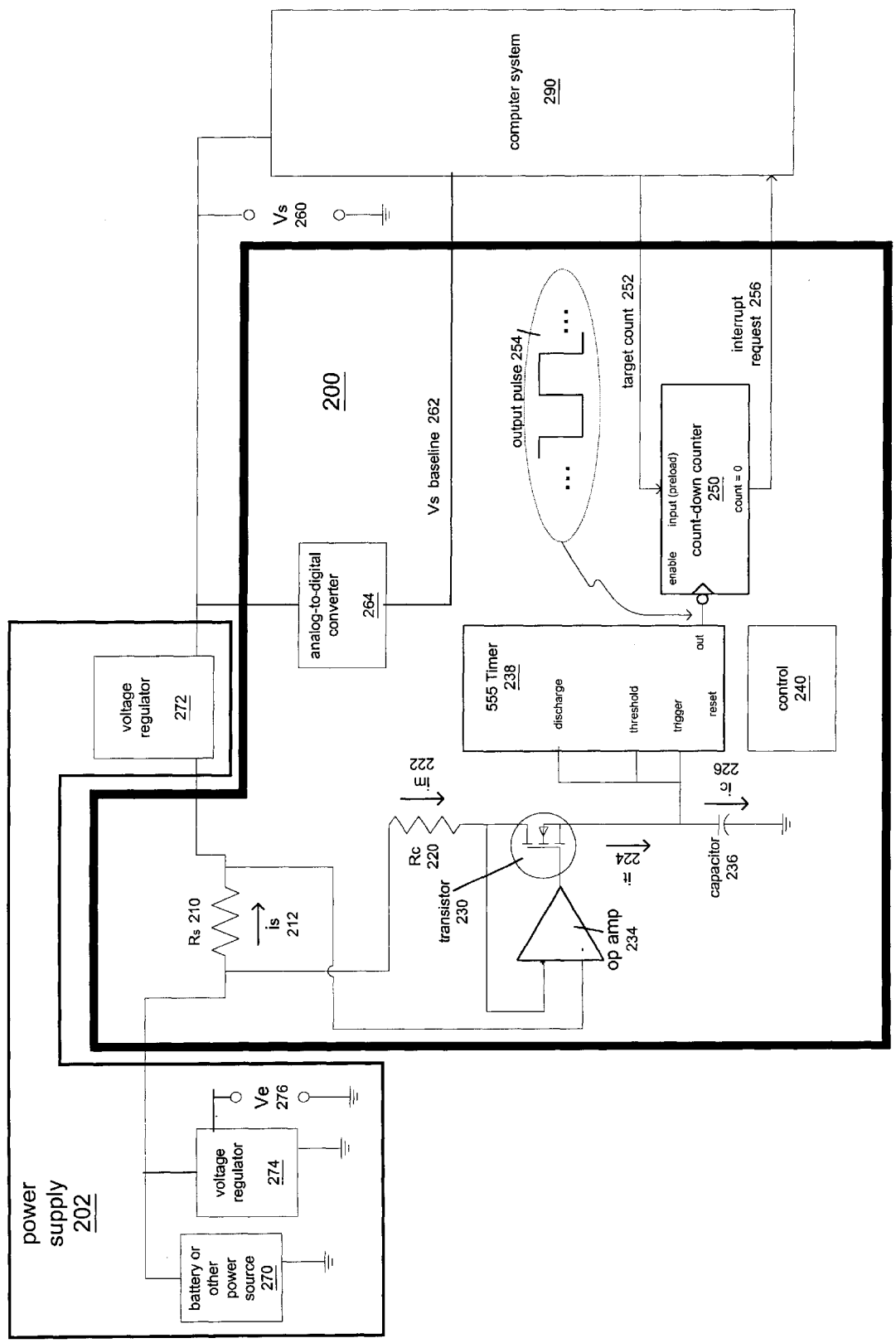
FIG. 2A is a circuit diagram of an embodiment of an energy-based sampling system in which the energy consumed by the energy-based sampling system is not measured.
Figure 2B:
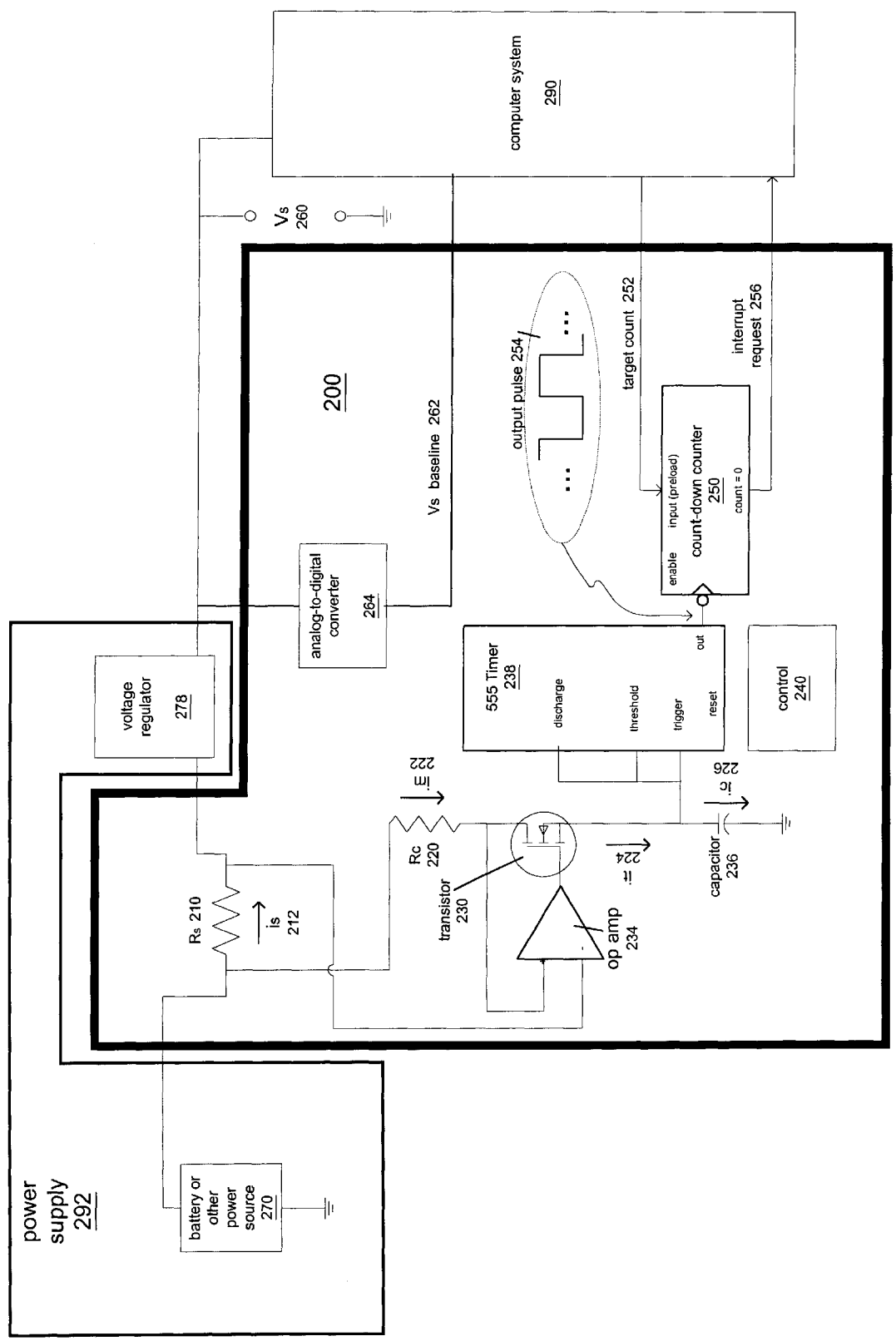
FIG. 2B is a circuit diagram of another embodiment of an energy-based sampling system in which the energy consumed by the energy-based sampling system is measured.
Figure 3:
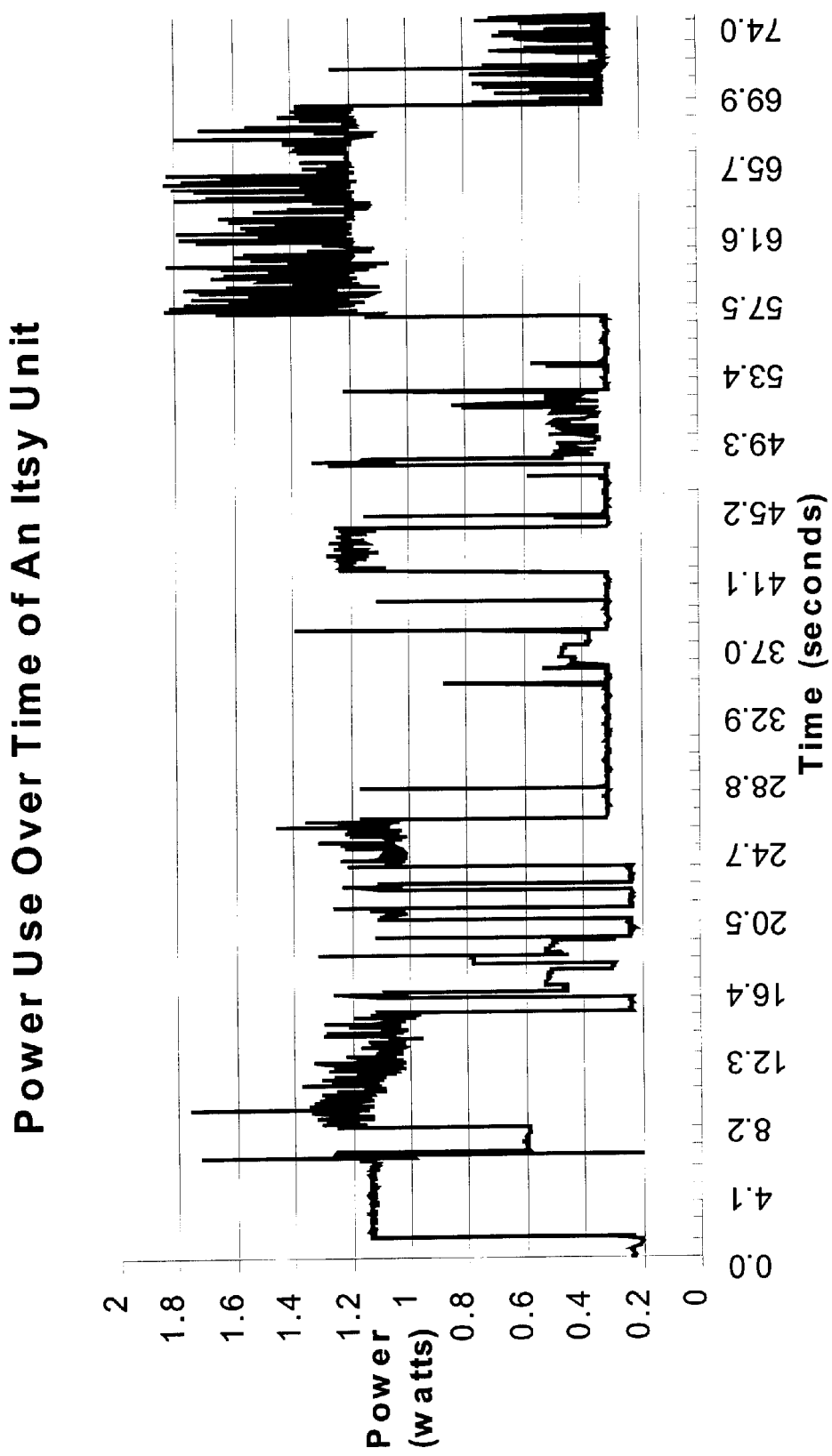
FIG. 3 is a graph illustrating the power use over time of a Compaq™ Itsy Pocket Computer.

FIGS. 2A and 2B are both diagrams of embodiments of an energy-based sampling system. The embodiments shown in FIGS. 2A and 2B differ in whether the electronic circuit that implements the energy-based sampling system (component 100 in FIG. 1) measures its own energy use in addition to that used by the computer system (component 102 in FIG. 1). In particular, the embodiment of FIG. 2A does not measure the energy used by the electronic circuit, while the embodiment of FIG. 2B does measure the energy used by the circuit. How this difference is manifested in the design will be discussed below in the discussion regarding the power supplies shown in FIGS. 2A and 2B.

FIG. 2A is a diagram of an embodiment of the energy-based sampling system 100 (FIG. 1) implemented as an electrical circuit 200 incorporated with computer system 290. The embodiment shown in FIG. 2A does not support the use of arbitrary energy targets, but rather supports energy targets that are whole-number multiples N of a fixed amount of energy E (the energy quanta). The value of the energy quanta E is determined by the properties of the components used in the implementation of circuit 200. The number N, the target count, is software-configurable, and is supplied by the sampling driver in one embodiment. A randomized sampling distribution is thus achieved by selecting different whole-number values for the target count.

A count-down counter 250 stores the value of the target count N. The value of N is provided by the computer system 290 as a target count 252. Circuit 200 decrements the counter 250 each time that the computer system 290 consumes an amount of energy equal to the energy quanta E. When the counter 250 reaches a value of zero, a zero detector that is integrated with the counter 250 generates an interrupt request signal 256. This interrupt request signal 256 is sent to the computer system 290.

A power supply 202 includes a battery or other power source 270 and two voltage regulators 272 and 274. Voltage regulator 274 powers circuit 200 while voltage regulator 272 supplies power to the computer system 290. Energy drawn from the voltage regular 272 by the computer system 290 is measured by the electrical circuit 200. The energy drawn from voltage regulator 272 during a time interval t is computed by measuring the current drawn by the voltage regulator 272 from power source 202 during time t, and multiplying this total value by a predetermined value of a supply voltage 260 ($V_s$) powering the computer system 290. This energy measurement includes the energy consumed by the voltage regulator 272.

This energy measurement approach assumes that the supply voltage 260 ($V_s$) may be treated as constant for the duration of the energy measurement. This assumption may be employed because, in practice, the amount by which the supply voltage varies over short time periods is sufficiently small that the error introduced in the energy measurement by assuming the supply voltage is constant may be ignored. For example, the power supply used in the Itsy Pocket Computer is expected to deliver the required voltages within 1% of the nominal values, a percentage error that can be ignored in computing energy consumption. The relatively small variation in the supply voltage is in part due to the common practice of designing power supplies for computer systems to filter out any electric noise introduced into the supply lines. A second factor regarding the small supply voltage variation is the use of voltage regulators that work to minimize voltage variations.

The energy-measuring circuit 200 operates as follows. A current mirror consisting of a resistor 210 ($R_s$) and a resistor 220 ($R_c$), an n-channel enhancement-type MOSFET transistor 230 and an op amp 234 is used to create a current 226 ($i_c$) in a capacitor 236 that is proportional to the current 212 ($i_s$) drawn by the computer system 290. The use of a MOSFET and an op amp to create a current mirror is well known in the art. The components of the current mirror are selected such that the relationship between the capacitor current 226 ($i_c$) and the computer system 290 current 212 ($i_s$) is given by:

$$i_s = i_c * R_c / R_s \qquad (1)$$

As the capacitor current 226 ($i_c$) flows through the capacitor 236, the voltage across the terminals of the capacitor 236 increases. One terminal of the capacitor 236 is connected to the trigger, threshold, and discharge terminals of a 555 timer 238, while the capacitor 236's other terminal is connected to ground. Connected in this well-known manner, the 555 timer 238 functions as a monostable multivibrator. Additional methods of implementing a monostable multivibrator are well know to those skilled in the art of analog circuit design. When connected in this way, per the design specifications of a 555 timer, the 555 timer 238 functions as follows. The 555 timer 238's output remains high (a logic one) until the voltage across the capacitor ($V_c$) reaches two-thirds of the voltage powering circuit 200, voltage 276 ($V_e$) ($2V_e/3$), at which point the output is driven low (a logic zero). At the same time as the output goes low, the 555 timer 238 will connect its discharge terminal to ground, and will leave it connected to ground until the voltage across the capacitor ($V_c$) decreases to one-third of the supply voltage 276 ($V_e/3$). Once the voltage $V_c$ decreases to this value, the discharge terminal is again allowed to float, the output is driven high, and the capacitor 236 will begin charging again. This sequence of charging and discharging produces an output pulse train 254 on the output of 555 timer 238.

Thus, an output pulse is generated whenever the voltage $V_c$ across the capacitor 236 increases by $V_e/3$. This voltage increase represents an increase in the amount of charge ($Q_c$) stored on the plates of the capacitor 236. The relation between the increase in capacitor 236 charge ($Q_c$) and the energy consumed by the computer system 290 during the time t it took to accumulate the charge $Q_c$ is given by:

$$Q_c = \int_0^t i_c(t)\,dt = C * \frac{V_e}{3} \qquad (2)$$

Where C is the capacitance of the capacitor 236 in Farads. The capacitor charge $Q_c$ is related to the charge $Q_s$ that passed through the resistor 210 ($R_s$) according to the known relationship between $i_c$ and $i_s$:

$$i_s = i_c * R_c / R$$

and therefore: $Q_s = Q_c * R_c / R_s$ (3)

The energy E in Joules consumed by the computer system 290 during the time t is given by:

$$E = \int_0^t V_s(t) i_s(t)\,dt \qquad (4)$$

However, because the voltage supply 260 ($V_s$) is assumed to be constant, the following relationship applies:

$$E = V_s * \int_0^t i_s(t)\,dt \qquad (5)$$

$$E = V_s * Q_s \qquad (6)$$

$$E = V_s * Q_c * \left(\frac{R_c}{R_s}\right) \qquad (7)$$

$$E = V_s * \left(C \frac{V_e}{3}\right)\left(\frac{R_c}{R_s}\right) \qquad (8)$$

$$E = V_s * V_e * C * \left(\frac{R_c}{3 * R_s}\right) \qquad (9)$$

Equation 9 provides a means of calculating the energy E that has been consumed by the computer system 290. The values of C (capacitance of capacitor 236), $R_c$ (resistance of resistor 220) and $R_s$ (resistance of resistor 210) are known and are stored on the computer system 290. The value of $V_e$, the supply voltage 276 for circuit 200, and the value of $V_s$, the supply voltage 260 for the computer system 290, are assumed to be constant for the duration of the energy measurement. This assumption can be made because, in practice, the variation in these voltages is sufficiently small that the error induced by assuming them to be constant may be ignored. However, to reduce the power consumed by a computer system, computer systems may be designed to permit the voltage at which they operate to be reduced. Further, $V_s$ may change slowly over time due to heat and component aging. Therefore, in one embodiment the computer system 290 is supplied with the value of $V_s$ (supply voltage 260) by an analog-to-digital converter 264 that periodically measures the supply voltage 260 and transmits a $V_s$ baseline value 262 to the computer system 290. Similarly, but not shown, an analog-to-digital converter may also be provided to measure the value of $V_e$, the supply voltage for the energy sampling circuit 200.

E represents the energy that has been consumed by the computer system 290 when each high-to-low transition occurs on the output of the 555 timer 238. Such transitions generate a train of output pulses 254. This train of pulses 254 is used to clock the count-down preloadable digital counter 250. The count-down counter 250 counts down from the target count 252 (containing the value N) to zero. When the counter 250 reaches a count of zero, an interrupt request 256 is sent to the processor. Since the counter 250 was initially loaded with the target count value N, each interrupt 256 signifies that N*E Joules of energy have been consumed by the computer system 290.

In response to the interrupt request 256, the computer system 290's processor will suspend execution of the processor's current application and will execute the sampling driver. The sampling driver records information concerning the program or region of code that was executing when the interrupt was serviced. Then, (as discussed previously), the sampling driver clears the interrupt request. Finally, the sampling driver loads a new target count value 252 into the count-down counter 250. The value written may be the same or different from the previous value written. Control circuit 240 detects that a new target count value has been written and asserts the reset input of 555 timer 238 for a sufficient period of time to allow the voltage ($V_c$) of capacitor 236 to be discharged to one third of the supply voltage 276 ($V_e/3$). In this way, the energy-measurement circuit 200 is returned to its initial state. The processor then returns back to executing the original application.

In another embodiment, the circuit 200 is modified to allow the sampling driver to estimate how many quanta of energy were consumed between the time that the interrupt was sent and the sampling driver began executing. To enable this functionality, the circuit 200 and computer system 290 must be modified so that the sampling driver can read the number of quanta that have occurred since the interrupt was sent. In particular, count-down counter 250 must be replaced with one that provides a count output; techniques whereby the count value can be read by software running on the processor are well known to those skilled in the art of digital design. The sampling driver can calculate the number of quanta by subtracting the value of the count read from the counter from the maximum count value. For example, if a M-bit counter is used and the sampling driver reads a value of $2^M-3$, then the driver would compute that 3 quanta had occurred since an interrupt was sent. Note however that this embodiment captures not only the energy consumed between the time that the interrupt is sent and the processor interrupts the running process, but also the energy consumed between the time that servicing the interrupt begins and the sampling driver actually reads the value of the count-down counter. However, by judicious engineering of the sampling driver, the latter amount of time can be minimized.

The components of the electrical circuit 200 are chosen to provide accuracy and minimize sources of error. The following component selection considerations are important in minimizing sources of error in the energy-measuring circuitry 200.

The energy measuring circuitry 200 is powered from voltage regulator 274, which is different from the voltage regulator (272) used to power the computer system 290. Thus the energy E being measured does not include the energy used to power circuit 200. However, because the amount of energy consumed by the circuit 200 is small compared to the energy consumed by the computer system 290, only a small error is introduced if both are powered from the same supply. This approach is used in the embodiment shown in FIG. 2B. In the embodiment shown in FIG. 2B, the two voltage regulators 272 and 274 of FIG. 2A are replaced with a single voltage regulator 278. Because a single regulator is used, equation 9 may be simplified by substituting the supply voltage 260 ($V_s$) for the supply voltage 276 ($V_e$), since both are the same voltage in the embodiment shown in FIG. 2B.

The measurement of the energy E is based on the voltage $V_c$ across the capacitor 236, which is determined by the charge stored on the capacitor $Q_c$. Capacitor 236 is chosen to have a low leakage current. For instance, in one embodiment, capacitor 236 is a Teflon or a polypropylene capacitor.

When the voltage $V_c$ across the capacitor 236 is equal to $2V_e/3$ (FIG. 2A) or $2V_s/3$ (FIG. 2B), the 555 timer 238 connects its discharge terminal to ground. A non-zero amount of time is then required for half of the stored charge on the capacitor 236 to drain out. During this time, the energy being consumed by the computer system 290 is not measured. The discharge time depends on the input impedances of the 555 timer 238's discharge, threshold, and trigger terminals.

In one embodiment, additional components are added to the electrical circuit 200 to decrease the impedance path of the capacitor 236 and speed up the capacitor 236 discharge time. A small-valued resistor and gating transistor are added in parallel with the capacitor 236. The transistor is turned on during the discharge cycle, providing a lower impedance path, and thus, a shorter discharge time.

In another embodiment, a larger-valued capacitor 236 is used to minimize the effect of capacitance discharge time. In a larger capacitor, the time spent accumulating charge grows faster than the time lost in discharge.

The value of capacitor 236 also affects the time required for energy samples collected by the sampling driver to reach a desired degree of accuracy. That is, because the mapping of energy to software components employs sampling, the accuracy by which the portion of overall energy that is consumed by a given software component is known increases as the number of samples acquired for the component increases. More precisely, the accuracy of statistically-sampled events is proportional to the square root of the number of samples collected, as explained by Jeff Dean, Jamey Hicks, Carl A. Waldspurger, and William E. Weihl, "ProfileMe: Hardware Support for Instruction-Level Profiling on Out-of-Order Processors," Proceedings of the 30$^{th}$ Annual International Symposium on Microarchitecture, Research Triangle Park, North Carolina, December 1997.

Thus, to obtain a given accuracy, the use of a large-valued capacitor will require an application to be run for a longer period of time than if a smaller-valued capacitor were used. However, the use of a too small-valued capacitor will increase the frequency at which the sampling driver is run, and hence, the amount that the software being profiled will be perturbed. Further, too frequent invocations of the sampling driver will increase the fraction of the total energy consumed by the computer system that is consumed by the profiling system. In practice, the value of the capacitor 236 is selected in conjunction with the width (i.e., number of bits) of the count-down counter 250 to ensure that a wide range of energy targets are available. At the same time, the need for accuracy must be balanced against minimizing the capacitance discharge time noted above.

A current mirror is formed from resistor 210 ($R_s$) and resistor 220 ($R_c$), the MOSFET transistor 230 and the op amp 234. An important attribute of this current mirror is that a known and predictable relationship exists between the current 224 ($i_t$) that flows out of the source of the transistor 230 and the current 212 ($i_s$) that flows into the computer system 290. From equation 1, this relationship is assumed to be:

$$i_t = {R_s}/{R_c} * i_s \qquad (10)$$

with the requirement that:

$$i_c = i_t \qquad (11)$$

The relationships of equations 10 and 11 are valid if the following component selection criteria are met: (1) the current flowing into the input terminals of the op amp 234 is much smaller than the current 222 ($i_m$) which flows through resistor 220 ($R_c$); (2) the current flowing from the gate to the source of the transistor 230 is much smaller than the current flowing into the drain of the transistor 230; and (3) the current flowing into the discharge, threshold, and trigger terminals of the 555 timer 238 is much smaller than current 224 ($i_t$).

The leakage currents noted above in criteria (1), (2) and (3) contribute to error in the measurement of the energy quanta E. In one embodiment, these leakage currents are minimized by: (1) choosing an op amp 234 with a high common mode rejection ration (CMRR), small input currents, and a low input offset voltage; (2) choosing a MOSFET transistor 230 that has a bandwidth significantly greater than the expected maximum frequency at which the current 212 ($i_s$) can change; (3) choosing a 555 timer 238 with small input currents; and (4) choosing $R_s$ 210 and $R_c$ 220 resistors that have a high tolerance to reduce the discrepancy between the ratio of their rated values and the ratio of their actual values. Components with these characteristics are readily available.

In one embodiment, the resistor 210 ($R_s$) is chosen by balancing two competing considerations. First, the voltage drop across the resistor 210 should be large enough so that the approximations noted in equations 10 and 11 hold. Second, as current 212 ($i_s$) flows through the resistor 210 ($R_s$), heat is generated. As this heat represents a source of energy loss, its amount should be minimized. Additionally, because the voltage drop across the resistor 210 reduces the maximum possible voltage that is available to the computer system 290, the voltage drop should be minimized so as to reduce the need for over designing the power supply 202.

The computer system 290 shown in FIGS. 2A and 2B includes only a single power domain, i.e. only a single voltage source 260 ($V_s$) powers the computer system 290. However, many computer systems employ several power domains. To enable energy-based profiling of multi-domain systems, two different embodiments may be used. In the first embodiment, separate energy counters, comparitors, and target registers may be provided for each power domain. In the second embodiment, a single counter, comparitor, and register is used, but these components are associated with the power domain from which all other domains are derived. For example, if a computer system is powered by a 3 Volt battery, and this voltage is stepped down to provide some components with 1 Volt and some with 2 Volts, we may either measure the energy consumed by each of the 1 and 2 Volt power domains (the first embodiment), or we may measure just the energy drawn from the 3 Volt domain (the second embodiment).

Although the invention has been described in considerable detail with reference to certain embodiments, other embodiments are possible. As will be understood by those of skill in the art, the invention may be embodied in other specific forms without departing from the essential characteristics thereof. For example, the energy-measuring function may be implemented using separate components, or as an ASIC. Additionally, the energy sampling system may be powered off of a separate power source. Accordingly, the present invention is intended to embrace all such alternatives, modifications and variations as fall within the spirit and scope of the appended claims and equivalents.

We claim:

1. An energy profiling system for use in associating energy consumption with a plurality of computer processes in a computer system, comprising:
    an energy counter for measuring energy consumed by the computer system; and
    an energy comparator that generates an interrupt request subject to a determination that the energy counter has reached a predetermined energy threshold.

2. The system of claim 1, further including:
    a sampling driver for determining information about a computer process in response to receiving the interrupt request from the energy comparator.

3. The system of claim 2, wherein the sampling driver determines a program counter address executing when the interrupt request is received.

4. The system of claim 3, wherein the sampling driver stores program counter addresses and uses the stored program counter addresses to statistically determine the amount of energy used by the plurality of computer processes associated with the program counter addresses.

5. The system of claim 1, further including:
    an energy target register that provides the energy comparator with the energy threshold value.

6. The system of claim 5, wherein the energy target register varies the energy threshold value using a randomized distribution about a mean energy threshold value.

7. The system of claim 1, further comprising a computer power supply powering the computer system, wherein the energy counter measures the energy output of the computer power supply powering the computer system.

8. The system of claim 1, wherein the energy counter is a joule counter.

9. A computer system adapted to determine the energy consumption associated with regions of software code within the computer system, the system comprising:
    a processor adapted to receive an interrupt signal and determine the software code executing at the time the interrupt signal is received; and
    an energy-based sampling system coupled to the processor, wherein the energy-based sampling system measures the energy consumption of the computer system and periodically generates the interrupt signal when the energy consumption reaches a predetermined energy threshold.

10. The system of claim 9, further comprising:
    a power source coupled to the processor and the energy-based sampling system, wherein the energy-based sampling system measures the energy drawn from the power source by the processor.

11. The system of claim 9, wherein the energy-based sampling system further comprises:
    a statistical sampling software module running on the processor and configured to associate a region of software code with an energy consumption level, whereby the number of times a region of code is associated with an interrupt signal is proportional to the energy consumption of the region of code.

12. An energy-based sampling system, comprising:
    a circuit for measuring the energy drawn from a power source and sending a first signal when an energy threshold is reached; and
    a count-down counter coupled to the circuit for receiving the signal and generating a second signal when a predetermined number of first signals have been received.

13. The system of claim 12 wherein the second signal is an interrupt request, further including:
    a processor coupled to the count-down counter for receiving the interrupt request and suspending the execution of a current application executing on the processor in response to the interrupt request.

14. The system of claim 12, wherein the circuit further comprises:
    a current mirror configured to generate a first current proportional to a second current drawn from the power source and coupled to a capacitor;
    the capacitor configured to receive the first current and coupled to a monostable multivibrator; and
    the monostable multivibrator configured to generate the first signal when the capacitor reaches a preset voltage limit.

15. The system of claim 12, wherein the circuit and the count-down counter are implemented using an application specific integrated circuit.

16. The system of claim 12, wherein the circuit further includes:
    an analog-to-digital converter for measuring the voltage supplied from the power source.

* * * * *